June 19, 1973 J. F. PAGANO ET AL 3,740,321
CELL PROPAGATOR

Filed April 15, 1970 3 Sheets-Sheet 1

INVENTORS
JOSEPH F. PAGANO &
JOSEPH R. VALENTA
BY
Smith, Harding, Earley & Follmer
ATTORNEYS June 19, 1973   J. F. PAGANO ET AL   3,740,321
CELL PROPAGATOR Filed April 15, 1970   3 Sheets-Sheet 3

INVENTORS
JOSEPH F. PAGANO &
JOSEPH R. VALENTA
BY
Smith, Harding, Earley & Follmer
ATTORNEYS United States Patent Office  3,740,321
Patented June 19, 1973

3,740,321
CELL PROPAGATOR
Joseph F. Pagano, Paoli, and Joseph R. Valenta, Strafford, Pa., assignors to Smith Kline & French Laboratories, Philadelphia, Pa.
Filed Apr. 15, 1970, Ser. No. 28,799
Int. Cl. C12k 9/00
U.S. Cl. 195—127                                    6 Claims

ABSTRACT OF THE DISCLOSURE

A cell propagator for artificially growing animal cells in in monolayer cultures comprises a plastic roller vessel containing a porous mass of plastic providing the growth surface. The cell propagator may, under appropriate conditions, be considered disposable. A fluid-tight seal is provided, allowing pH monitoring, feeding, aeration, sampling and harvesting through probes while the vessel is rotating.

BACKGROUND OF THE INVENTION

This invention relates to cell propagators or tissue culture vessels of the type used in the production and development of virus vaccines. Viruses are capable of multiplying only in a living cell medium, and the artificial growing of animal cells has made efficient virus production possible. Bovine kidney cells, mouse embryo cells and the like have been used. For a discussion of a method of virus reproduction, reference may be made to R. E. Weiss and J. B. Schleicher, A Multisurface Tissue Propagator for the Mass-Scale Growth of Cell Monolayers, Biotechnology and Bioengineering, Vol. X, pp. 601–615 (1968).

It has been observed that animal cells of the kind here involved generally require a solid surface to which they may attach, i.e., they will not grow in suspension. Furthermore, the cells require exposure to a gaseous medium as well as to a liquid nutrient medium. Accordingly, various types of tissue culture vessels have been used, ranging in complexity from simple glass bottles, through "roller vessels" which pass the cells alternately through a liquid phase and a gas phase, to complex multiple-surface vessels, examples of which are described in the paper by Weiss and Schleicher. In the simple tissue culture vessels, the only surface area to which the animal cells can be adhere is provided by the inside walls of the vessels themselves. In the more complex tissue culture vessels, additional surface area is generally provided by glass plates contained within the vessel, although other materials such as titanium have been used.

The principal advantage resulting from the use of vessels having large internal surface areas is that fewer vessels are needed to produce a given quantity of cells. This simplifies pH monitoring and control, introduction of oxygen, removal and addition of fresh nutrient medium and addition and removal of cells and virus. On the other hand, these complex vessels having large internal surface configurations have been expensive, difficult to produce and difficult to assemble and take apart. Because of the high cost of these vessels in relation to the amount of virus which they are capable of producing, it has not been feasible to dispose of them after a single use. Instead, they are cleaned and used over again.

Even complex vessels having satcks of glass sheets produce a relatively low yield of cells compared with the theoretically possible yield for a given amount of nutrient. Accordingly, it is often necessary to use a large number of vessels to produce a desired quantity of cells.

In many instances, it has been found advantageous to use "roller vessels," as mentioned above, which pass the cells alternately through a liquid phase and a gas phase. One of the problems in the use of roller vessels is the difficulty of obtaining access to the interior of the vessel while it is in rotation for the purpose of measuring pH of the nutrient medium or for the purpose of adding or removing nutrient, aeration, harvesting or sampling cells. These vessels should be sealed from the atmosphere while in rotation to prevent contamination of the substances within them.

So far as we are aware, no attempts have been made to construct a roller vessel having a large internal surface area, or to construct a roller vessel in which various conditions can be controlled and monitored while the vessel is in rotation.

We are not aware of any successful attempts to produce a satisfactory disposable roller vessel with a relatively high internal surface area for cell growth.

SUMMARY OF THE INVENTION

In accordance with this invention, the roller vessel comprises a plastic bottle containing a porous mass of a suitable plastic material for providing a growth surface. The mass of plastic material can be made up of a plurality of uniformly shaped units resembling jacks packed together. Alternatively, dimpled plastic sheets may be used. If the dimpled plastic sheets extend to the wall of the roller vessel, they must be perforated to allow flow of liquid and passage of cells through the vessel. As another alternative, an open-cell plastic matrix may be used.

In order to allow access to the interior of the vessel while it is in rotation while maintaining a fluid-tight seal at the mouth of the roller vessel, a sealing device is provided which comprises two cooperating parts forming a labyrinth and held in tight engagement with each other.

The principal object of this invention is to provide a roller vessel for the propagation of tissue cultures which provide a large internal surface area for cell growth so that the volume within the vessel is utilized efficiently.

A further object is to provide a roller vessel which is sufficiently inexpensive that it may be considered disposable.

A further object of the invention is to provide continuous access to the interior of the roller vessel during rotation while maintaining a fluid-tight seal at the mouth of the roller vessel.

A further object is to provide a tissue culture vessel having a large internal surface area and, therefore, capable of producing a large yield of cells.

Other objects will be apparent from the following description read in conjunction with the drawings.

DESCRIPTION OF THE PREFERRED EMBODIMENT

For a proper understanding of the following description, it should be noted that the term "surface," as used therein, means either a continuous surface or a discontinuous surface, an example of the latter being that surface constituted by any two sides of a cube, whether adjacent or opposite each other.

Figure 1A:
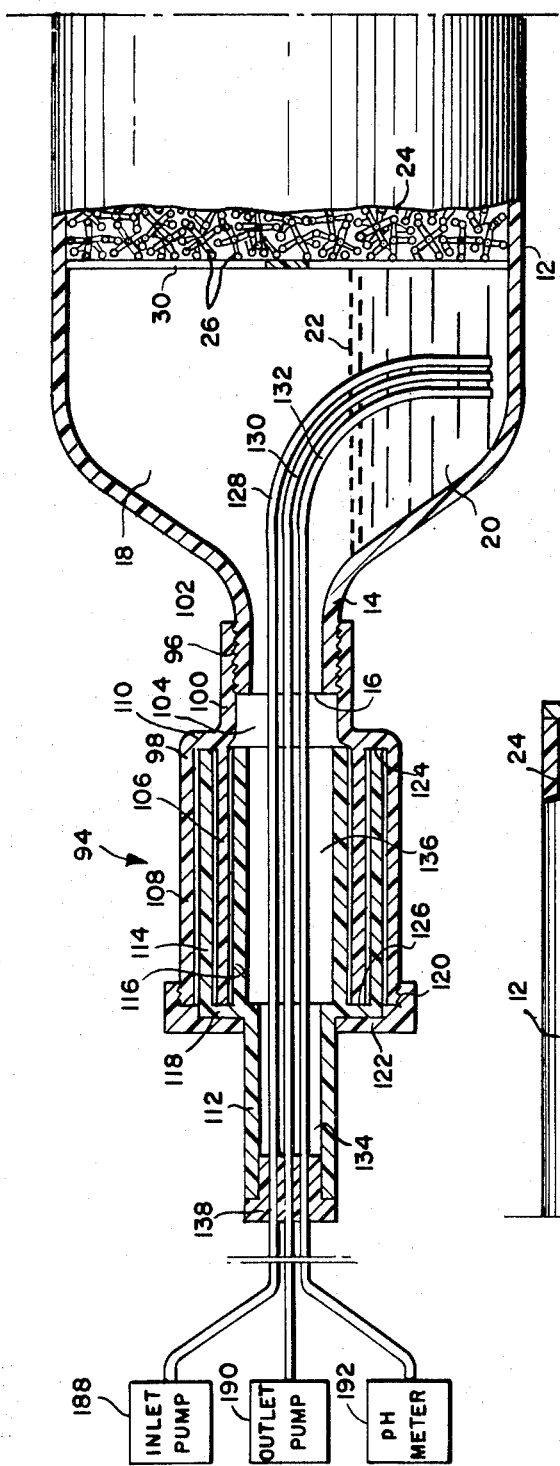
FIG. 1A is an axial section of the mouth end of a roller vessel in accordance with the invention, also showing the details of the sealing device.
Figure 1B:
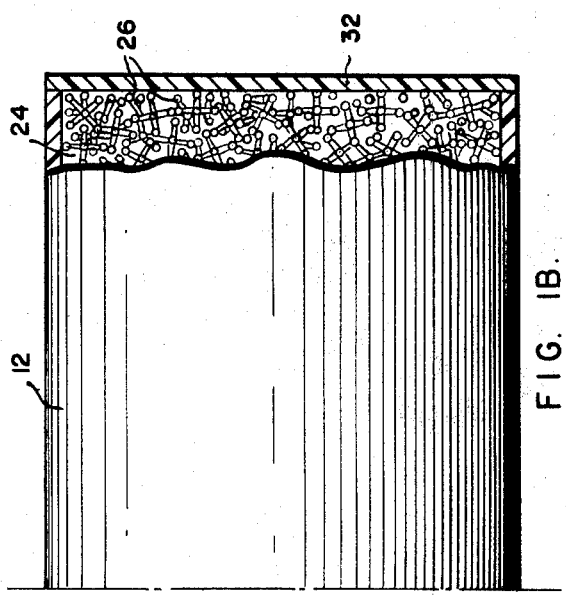
FIG. 1B is an axial section of the part of the roller vessel not shown in FIG. 1A.
Figure 7:
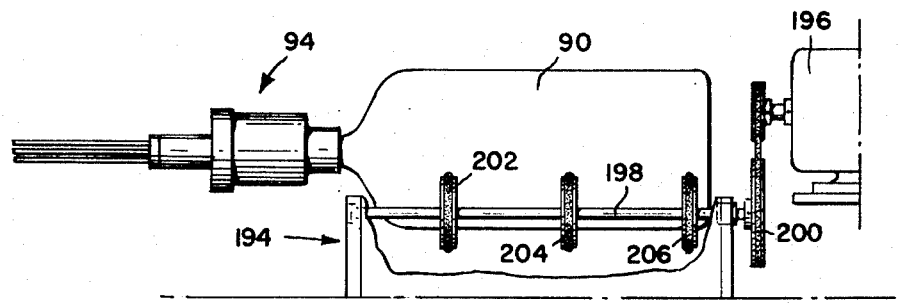
FIG. 7 is an elevation of the roller vessel of FIGS. 1A and 1B, shown in engagement with a motor-driven roller mechanism.

FIGS. 1A and 1B show a roller vessel having a cylindrical outer surface 12 adapted to be engaged by driving rollers, as shown in FIG. 7. Near the mouth end of the vessel, the vessel narrows, forming a neck at 14. The neck defines a circular opening 16 which is preferably coaxial with the cylindrical surface 12, so that stationary elements can extend through opening 16 while the vessel is in rotation without coming into contact with the wall of the vessel as a result of its rotation.

Within the vessel, two separate spaces are provided. Space 18, nearer the mouth of the vessel, does not contain a porous plastic growth matrix, and is provided in order to accommodate probes which may extend into the liquid nutrient medium 20 or into the gas above the liquid nutrient medium. Liquid medium 20 may fill the vessel up to level 22. The liquid medium may be kept at a low level in order to produce a more highly concentrated product and also to produce a more efficient use of medium.

Figure 2:
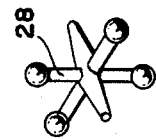
FIG. 2 is a perspective view of one of the jack-like plastic elements which make up one form of the porous mass of plastic when packed together.

The remaining space 24 within the vessel contains the porous mass 26 of synthetic resin which provides the large surface area for cell growth. In FIGS. 1A and 1B, the mass 26 consists of uniformly-shaped jack-like elements packed together. One such jack-like element 28 is shown in FIG. 2. These elements can be conveniently produced by molding.

A cross-shaped barrier 30 is frictionally held in place. The barrier separates space 18 from space 24, and prevents the jack-like elements from falling into space 18 as the vessel is being assembled. In assembly, the jack-like elements may be introduced through the end of the vessel opposite the mouth, since closure 32 is installed as a last step. Although the jack-like elements tend to hold together by themselves, it is desirable to provide some means for preventing one or more of the elements from falling away from the main body of elements. This can be accomplished by ultrasonic welding which will cause the elements to fuse together at their mutual points of contact.

Figure 3:
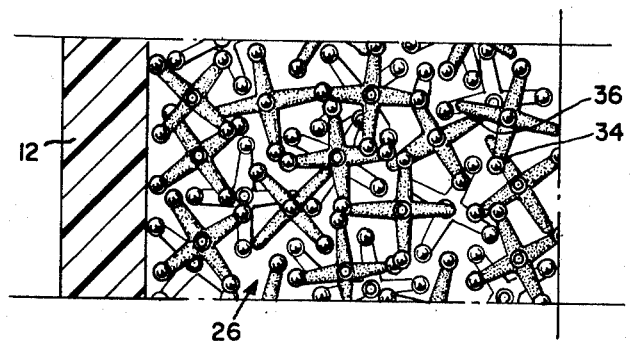
FIG. 3 is part of an axial section of a roller vessel showing a porous mass of plastic consisting of jack-like elements.

FIG. 3 shows in greater detail the relationship between the various elements of mass 26. Points of contact at which elements are fused together are indicated at 34 and 36.

Figure 4:
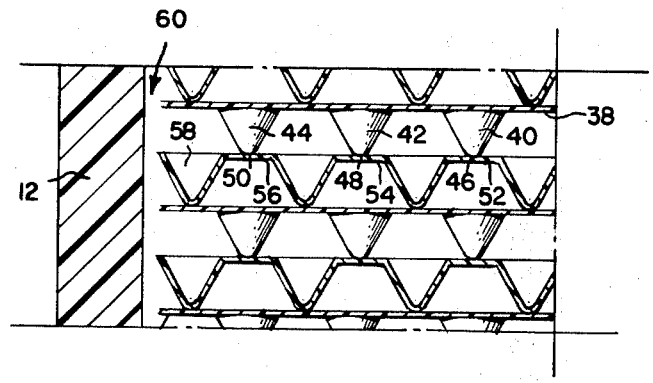
FIG. 4 is part of an axial section of a roller vessel showing a porous mass of plastic consisting of dimpled plastic sheets.

As an alternative, the porous mass, in which the cells grow, may be provided by a plurality of plastic sheets arranged in spaced, parallel relation to each other as shown in FIG. 4. These sheets have dimple-like projections which maintain the space between the sheets. For example, sheet 38 has projections 40, 42 and 44 among others (not shown). These projections are in contact respectively at points 46, 48 and 50 with unprojected parts 52, 54 and 56 of the next adjacent sheet 58.

Preferably, these projections are provided in a uniform pattern on each of the sheets. The sheets can then be laterally displaced from each other in such a way that all of the projections on one sheet will come into contact with unprojected parts on the next sheet. In this way, the sheets are prevented from nesting together.

It is not necessary that all of the projections project from the same side of a sheet, although this form may be most desirable from the standpoint of manufacture. If the projections are arranged as shown in FIG. 4, it will be apparent that the projections on all but one of the sheets in the stack will be in contact with unprojected parts of a next adjacent sheet. The projections on the last sheet in the stack, of course, will not come into contact with a next sheet. However, the last sheet might have projections projecting from both of its sides. In that case, all of the sheets will have projections contacting unprojected parts of a next adjacent sheet.

In the structure shown in FIG. 4, the sheets may be held together by a support such as support 30 in FIG. 1A and a closure such as closure 32 in FIG. 1B. The sheets may be held together by ultrasonic welding, effecting fusing at the points of contact between the projections and the unprojected parts of the adjacent sheets. Both means for holding the sheets together may be used if desired.

The assembly of sheets shown in FIG. 4 provides a porous structure having a very large surface area for supporting monolayer cultures. The area of this surface is considerably larger than would be provided by a set of parallel planar surfaces in the same volume.

Figure 5:
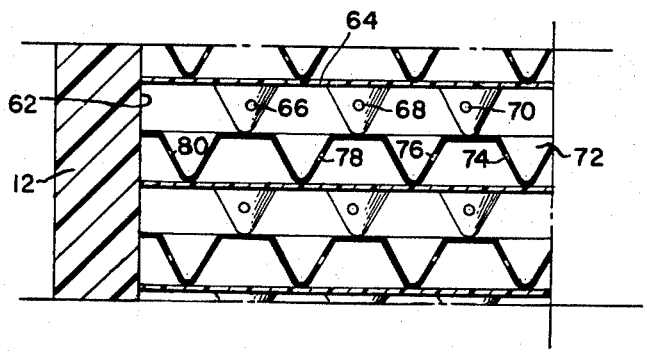
FIG. 5 is part of an axial section of a roller vessel showing a porous mass of plastic consisting of perforated plastic sheets.

In the structure in FIG. 4, flow of liquid cannot take place through the sheets; flow must take place around the edges of the sheets, and a space must be provided as indicated at 60. Accordingly, careful attention must be paid to the matter of aligning the sheets during assembly and maintaining their alinment. Otherwise, liquid could be trapped. In FIG. 5, however, the edges of the sheets extend to the inner surface 62 of the wall 12 of the roller vessel. The sheets are constructed with dimple-like projections, and are very similar to the sheets shown in FIG. 4. Perforations are provided, however. In sheet 64, perforations are shown at 66, 68 and 70. In sheet 72, perforations are shown at 74, 76, 78 and 80. The remaining sheets have similar perforations. These perforations allow the flow of liquid and the passage of cells through the sheets.

Figure 6:
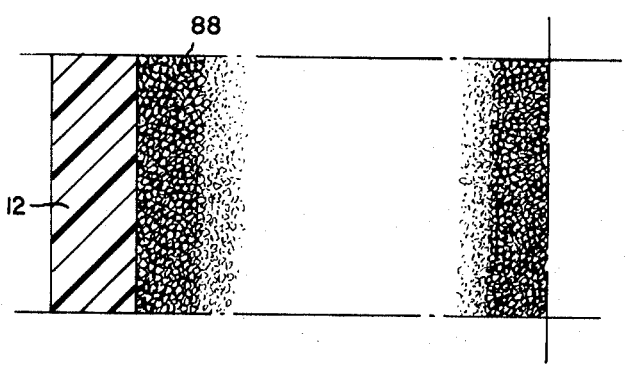
FIG. 6 is a part of an axial section of a roller vessel showing a porous mass of plastic comprising an open-cell plastic matrix.

FIG. 6 illustrates a still further alternative structure for the porous mass of plastic. In this case, an open-cell plastic matrix 88 is used. Care must be taken in the formation of the plastic matrix that it is sufficiently porous not only to allow the flow of the liquid nutrient medium through its interstices, but also porous enough to allow the free passage of cells. Otherwise, difficulty might be encountered in sampling or in harvesting cells.

Figure 8:
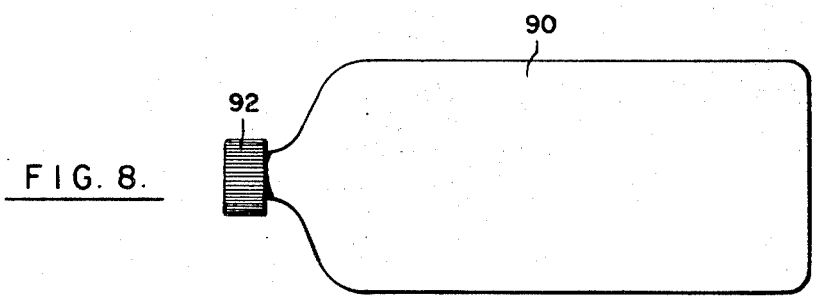
FIG. 8 is an elevation of the roller vessel shown in FIGS. 1A, 1B and 7 with a cap device, instead of a sealing device, attached to its mouth.

No matter what structure is used for the porous mass of plastic, the roller vessel may be supplied in the form illustrated in FIG. 8, which shows a roller vessel 90 having a screw cap 92.

When the vessel is to be put into use, cap 92 is removed, and a sealing device 94 (FIGS. 1A and 7) is installed in place of the cap on threads 96 on the neck of the vessel. Sealing device 94 comprises two main parts. The first part 98 consists of a cylindrical member 100 having internal threads 102 engageable with threads 96 of the vessel. Cylindrical member 100 has a central passage 104 which is arranged in alignment with the passage in the neck of the roller vessel, which in turn, is in alignment with the axis of rotation of the roller vessel. Cylindrical member 100 is integral with two coaxial cylindrical members 106 and 108. Members 106 and 108 are radially spaced and connected at 110.

The second main part of the sealing device 94 comprises a hollow cylindrical member 112, which is integrally connected with two coaxial cylindrical members 114 and 116. Members 114 and 116 are connected at 118, the connection being similar to connection 110. The relative dimesions of the two main parts of the sealing device are such that cylindrical member 114 fits into the annular slot between members 106 and 108, and cylindrical member 106 similarly fits into the annular slot between members 114 and 116. Members 106, 108, 114 and 116, along with connections 110 and 118 form a labyrinth which constitutes an effective fluid-tight seal, allowing relative rotation of the first and second main parts of the sealing device. Member 108 is threaded at 120, and a resilient cap 122, having a central opening for cylindrical element 112, is threaded onto threads 120. This cap holds the two main parts of the sealing device in tight engagement with each other; it prevents the end 124 of cylindrical member 114 from becoming separated from the inner surface of connection 110, and likewise prevents the end 126 of cylindrical member 106 from becoming separated from the inner surface of connection 118.

The three tubes 128, 130 and 132 extend through passage 134 in the second main part of the sealing device, through passage 136 within cylindrical member 116, and through passage 104 into the interior of the vessel, wherein they are curved downwardly into liquid 20. All three tubes are sealed within passage 134 by a seal 138 in the end of element 112. Tube 128 connects to an inlet pump 188, which is arranged to deliver fluid from the exterior into the interior of the vessel for the purpose of adding nutrient or other materials or for the purpose of aeration. Tube 130 conneced to an outlet pump 190 which is adapted to remove liquid from the vessel. Tube 132 is connected to a pH meter 192.

Even while the roller vessel is in rotation, tubes 128, 130 and 132 are allowed to remain stationary and in contact with the liquid in the interior of the roller vessel, while a fluid-tight seal is maintained by sealing device 94 to mantain internal sterility of the unit.

It will be apparent that the sealing device 94 will accommodate other or additional probes as well as tubes 128, 130 and 132. It is only necessary that the axis of rotation of the roller vessel pass through the opening in its neck and the passage 104 of the first main part of the sealing device.

In FIG. 7, roller vessel 90 is shown in conjunction with a driving device 194 which comprises a motor 196 driving shaft 198 through belt 200. Vessel 90 rests on rollers 202, 204 and 206, and on idling rollers (not shown) on the opposite side of the vessel.

Figure 9:
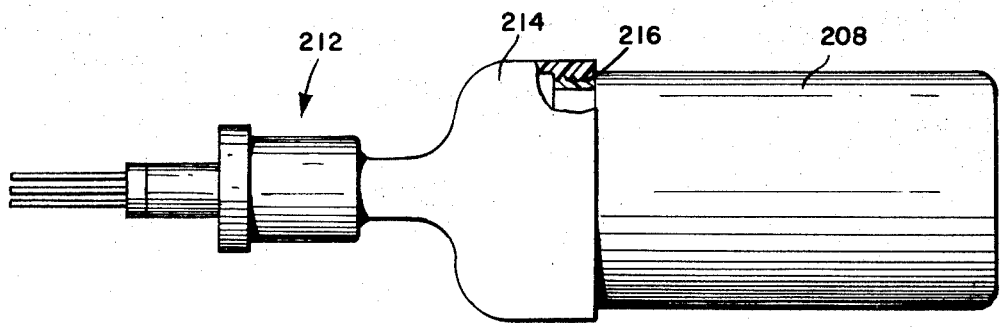
FIG. 9 is a partly cut away elevation of a modified form of the roller vessel showing a modified sealing device.
Figure 10:
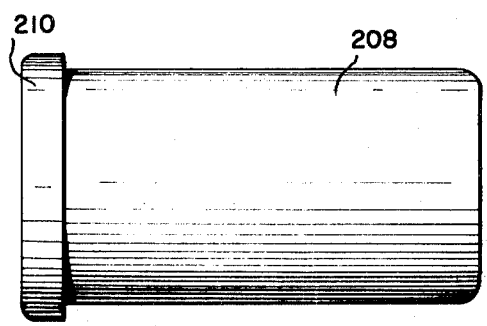
FIG. 10 is an elevation of the modified roller vessel of FIG. 9 with a cap, instead of a sealing device, attached to its mouth.

The roller vessel can be provided in an alternative form having a wide mouth as illustrated in FIGS. 9 and 10. With the vessel in this form, the porous plastic mass can be introduced more easily. Since it can be introduced through the mouth of the vessel, it is not necessary to introduce the porous plastic material through the bottom of the vessel and thereafter seal a closure such as closure 32 in FIG. 1B.

FIG. 10 shows a vessel 208, as it would ordinarily be supplied. Vessel 208 has a wide mouth covered by cap 210. Vessel 208 may be used with a modified sealing device, shown in FIG. 9. This modified sealing device has an enlarged internal thread section 214, which is adapted to engage the threads 216 at the mouth of the vessel 208. Sealing device 212 has exactly the same function as does sealing device 94. The sealing device may be adapted for use in conjunction with wide-mouth vessels such as vessel 208 by providing an adapter which is threaded at both ends and similar in shape to section 214 (FIG. 9).

Vessel 208 may be made of glass or heavy plastic, and may be reused. The mass of plastic may be removed through the mouth of the vessel after a run, and may be either cleaned and reused, or discarded.

Any suitable synthetic resins (plastics), such as for example methyl methacrylate or polystyrene, may be used to form the porous mass of plastic, and the various other elements described herein.

The porous mass of plastic which provides the growth surface, may be constructed differently from the embodiments specifically described, so long as the porosity is sufficient to allow flow of the liquid medium and to allow the free passage of the cells through its interstices. The other elements of the cell propagator may also differ from the embodiments described. As is seen from the operation of the invention, the flow through the porous mass of plastics is omni-directional to permit the liquid medium to permeate the mass and then discharge from it to provide for permeation by the gaseous medium repeatedly as the roller vessel is rotated.

We claim:
1. A cell propagator comprsing
   means defining an enclosure for containing a quantity of liquid nutrient medium, at least part of the outer surface of the enclosure being in the form of a circular cylinder adapted to be engaged and rotated by power-driven rollers, and
   means, which occupy a major portion of the interior of said enclosure and which rotate therewith, providing a surface for supporting a monolayer cell culture, the latter means comprising a substantially rigid mass of plastic, said mass being sufficiently porous to allow omni-directional flow of said medium through its interstices and to allow free passage of cells through its interstices.

2. A cell propagator according to claim 1 in which said mass of plastic is an open-cell plastic matrix.

3. A cell propagator in accordance with claim 1 in which the plastic is polystyrene.

4. A cell propagator in accordance with claim 1 in which the plastic is methyl methacrylate.

5. A cell propagator in accordance with claim 2 in which the plastic is polystyrene.

6. A cell propagator in accordance with claim 2 in which the plastic is methyl methacrylate.

References Cited

UNITED STATES PATENTS

| | | | |
|---|---|---|---|
| 3,281,307 | 10/1966 | Mueller et al. | 195—142 |
| 3,027,305 | 3/1962 | Freeman | 195—127 |
| 835,836 | 11/1906 | Schulz | 277—57 |

OTHER REFERENCES

"'Rollacell' Tissue Culture Apparatus," 1968, pp. 1–8, New Brunswick Scientific Co., Inc., New Brunswick, N.J.

Parker, Methods of Tissue Culture, 1961, pp. 170–172 and 195–196, Harper and Row, Publisher Inc., New York, N.Y.

A. LOUIS MONACELL, Primary Examiner

R. M. ELLIOTT, Assistant Examiner

U.S. Cl. X.R.

195—139